(12) United States Patent
Ootsuka et al.

(10) Patent No.: US 8,596,720 B2
(45) Date of Patent: Dec. 3, 2013

(54) VEHICLE SEAT

(75) Inventors: Taiyou Ootsuka, Toyota (JP);
Tomokazu Igarashi, Miyoshi (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 118 days.

(21) Appl. No.: 13/302,406

(22) Filed: Nov. 22, 2011

(65) Prior Publication Data
US 2012/0133187 A1 May 31, 2012

(30) Foreign Application Priority Data

Nov. 29, 2010 (JP) ................................. 2010-264764

(51) Int. Cl.
*B60N 2/02* (2006.01)
*B60N 2/06* (2006.01)
*B60N 2/20* (2006.01)

(52) U.S. Cl.
USPC ................. 297/344.11; 297/344.1; 296/65.11

(58) Field of Classification Search
USPC ......................... 297/344.1, 344.11; 296/65.11
See application file for complete search history.

(56) References Cited

U.S. PATENT DOCUMENTS

| | | | | |
|---|---|---|---|---|
| 2,753,947 | A | * | 7/1956 | Mach ...................... 296/65.11 X |
| 4,479,752 | A | * | 10/1984 | Todd ....................... 296/65.11 X |
| 4,834,452 | A | | 5/1989 | Goodrich |
| 5,524,952 | A | | 6/1996 | Czech et al. |
| 6,024,398 | A | | 2/2000 | Horton et al. |
| 6,113,175 | A | * | 9/2000 | Guim et al. ................. 296/65.18 |
| 6,129,405 | A | * | 10/2000 | Miyahara et al. .......... 296/65.11 |
| 6,435,590 | B2 | * | 8/2002 | Miyahara et al. .......... 296/65.11 |
| 6,557,919 | B2 | | 5/2003 | Suga et al. |
| 6,609,745 | B2 | * | 8/2003 | Miyahara et al. .......... 296/65.11 |
| 6,616,230 | B2 | * | 9/2003 | Niikura ................ 297/344.11 X |
| 6,648,393 | B1 | * | 11/2003 | Milnar et al. .............. 296/65.11 |
| RE39,101 | E | * | 5/2006 | Miyahara et al. .......... 296/65.11 |
| 7,441,822 | B1 | * | 10/2008 | Day ........................... 296/65.11 |

(Continued)

FOREIGN PATENT DOCUMENTS

| | | |
|---|---|---|
| DE | 102004015450 | 11/2005 |
| DE | 69828959 | 1/2006 |

(Continued)

OTHER PUBLICATIONS

Germany Office action, dated Mar. 26, 2013 along with an english translation thereof.

(Continued)

*Primary Examiner* — Rodney B White
(74) *Attorney, Agent, or Firm* — Greenblum & Bernstein P.L.C.

(57) ABSTRACT

A vehicle sheet includes: a longitudinal sliding mechanism configured to support a seat body such that the seat body is slidable relative to a vehicle floor in the vehicle longitudinal direction; a lateral sliding mechanism configured to support the seat body such that the seat body is slidable in the vehicle lateral direction; a reclining mechanism configured to connect a seat back to a seat cushion and adjust a reclining angle of the seat back; a first lever configured to be able to cancel fixation of the reclining angle of the seat back, which has been provided by the reclining mechanism; and a release mechanism configured to release locks on both the longitudinal sliding mechanism and the lateral sliding mechanism upon detection of a motion of tilting the seat back to a forward tilt position, which is caused by an operation of the first lever.

10 Claims, 12 Drawing Sheets

(56) References Cited

U.S. PATENT DOCUMENTS

| | | | |
|---|---|---|---|
| 7,510,227 B2* | 3/2009 | Mahaffy | 296/65.11 X |
| 7,533,937 B2 | 5/2009 | Beneker et al. | |
| 7,618,009 B2* | 11/2009 | Glockler | 244/118.1 |
| 7,748,766 B2* | 7/2010 | Villeminey | 296/64 |
| 7,819,475 B2* | 10/2010 | Shao | 297/344.11 |
| 7,866,723 B2* | 1/2011 | Ninio et al. | 296/65.11 |
| 8,042,855 B2* | 10/2011 | Blatseas et al. | 296/65.11 |
| 8,109,577 B2* | 2/2012 | Shao | 297/463.2 |
| 8,245,994 B2* | 8/2012 | Yamada et al. | 297/344.11 |
| 8,251,427 B2* | 8/2012 | Lindsay | 296/65.11 |
| 2001/0038223 A1 | 11/2001 | Suga et al. | |
| 2006/0061175 A1 | 3/2006 | Beneker et al. | |
| 2006/0220411 A1* | 10/2006 | Pathak et al. | 296/65.11 |
| 2012/0032466 A1* | 2/2012 | Line et al. | 296/65.11 X |

FOREIGN PATENT DOCUMENTS

| | | |
|---|---|---|
| DE | 102004061139 | 1/2006 |
| DE | 102005044555 | 2/2007 |
| EP | 0800952 | 10/1997 |
| JP | 2006-8028 | 1/2006 |
| JP | 2009-292435 | 12/2009 |

OTHER PUBLICATIONS

U.S. Appl. No. 13/302,204 to Taiyou Ootsuka et al., filed Nov. 22, 2011.

* cited by examiner

VEHICLE SEAT

INCORPORATION BY REFERENCE

The disclosure of Japanese Patent Application No. 2010-264764 filed on Nov. 29, 2010, including the specification, drawings and abstract, is incorporated herein by reference in its entirety.

BACKGROUND OF THE INVENTION

1. Field of the Invention

The invention relates to a vehicle seat. More particularly, the invention relates to a vehicle seat provided with a longitudinal sliding mechanism that supports a seat body such that the seat body is slidable relative to a vehicle floor in the longitudinal direction of a vehicle, and a lateral sliding mechanism that supports the seat body such that the seat body is slidable relative to the vehicle floor in the lateral direction of the vehicle.

2. Description of Related Art

A conventional vehicle seat is structured such that a longitudinal sliding mechanism allows a seat body to slide relative to a vehicle floor in the longitudinal direction of a vehicle and a lateral sliding mechanism allows the seat body to slide relative to the vehicle floor in the lateral direction of the vehicle (see Japanese Patent Application Publication No. 2006-8028 (JP-A-2006-8028)). This vehicle seat is provided as a second row seat in the vehicle. When a seat back is tilted toward the front of the vehicle, the lock on the longitudinal sliding mechanism is released, allowing the seat body to move toward the front of the vehicle, in a position in which the seat body is folded forward compactly. As a result, the space behind the vehicle seat is increased, which creates a larger boarding space through which an occupant gets into a back seat from a door lateral to the vehicle seat.

According to the conventional technology described above, a lever used to release the lock on the lateral sliding mechanism is provided separately from a lever used to release the lock on the longitudinal sliding mechanism. Thus, when the vehicle seat is moved toward the front of the vehicle, if the boarding space through which an occupant gets into a third row seat needs to be further increased by releasing the lock on the lateral sliding mechanism and moving the vehicle seat inward in the vehicle, it is necessary to operate the levers in several steps. This makes the lever operation cumbersome.

SUMMARY OF THE INVENTION

The invention provides a technique for moving a vehicle seat such that a larger boarding space through which an occupant gets into a vehicle is obtained through a simple operation.

An aspect of the invention relates to a vehicle sheet, including: a longitudinal sliding mechanism configured to support a seat body such that the seat body is slidable relative to a vehicle floor in the vehicle longitudinal direction; a lateral sliding mechanism configured to support the seat body such that the seat body is slidable in the vehicle lateral direction; a reclining mechanism configured to connect a seat back to a seat cushion and adjust a reclining angle of the seat back; a first lever configured to be able to cancel fixation of the reclining angle of the seat back, which has been provided by the reclining mechanism; and a release mechanism configured to release locks on both the longitudinal sliding mechanism and the lateral sliding mechanism upon detection of a motion of tilting the seat back to a forward tilt position, which is caused by an operation of the first lever.

In the vehicle seat described above, when the first lever is operated to tilt the seat back to the forward tilt position, the locks on both the longitudinal sliding mechanism and the lateral sliding mechanism are released by the release mechanism. Thus, the seat body is allowed to slide toward the front of the vehicle and inward in the vehicle, in a position in which the seat body is folded forward compactly by tilting the seat back toward the front of the vehicle. This makes it possible to create a large boarding space, through which an occupant gets into a seat in the back row from a door located lateral to the seat body. As described above, it is possible to move the vehicle seat such that the large boarding space through which an occupant gets into the vehicle is obtained through a simple operation of the first lever.

In the vehicle seat described above, the release mechanism may include an operating mechanism, a transmission mechanism, a first link and a second link. The operating mechanism is configured to be operated by a second lever that is operated by an occupant seated in the seat body. The transmission mechanism is configured to operate the operating mechanism by transmitting a motion of tilting the seat back to the forward tilt position. The first link is configured to be operated by the operating mechanism so as to release the lock on the longitudinal sliding mechanism. The second link is configured to be operated by the operating mechanism so as to release the lock on the lateral sliding mechanism. In this structure, the operating mechanism may be an operating pin that is fixedly attached to the second lever.

In the vehicle seat described above, the release mechanism is actuated when the seat back is tilted to the forward tilt position through an operation of the first lever. Alternatively, the release mechanism may be actuated when the second lever is operated by an occupant sitting on the vehicle seat. Thus, not only when the seat body is moved to increase the boarding space through which an occupant gets into the vehicle, but also when the seat body is moved to adjust the seating location of the occupant, it is possible to flexibly adjust the position of the seat body in the vehicle longitudinal direction and the vehicle lateral direction through a simple operation.

In the vehicle seat described above, when the second link is at an initial position, the second link may not be in contact with the operating pin such that there is a gap between the second link and the operating pin in the direction in which the second link pivots.

In the vehicle seat described above, when the second link is at the initial position, the second link is not in contact with the operating pin, and there is a gap between the second link and the operating pin in the direction in which the second link pivots. Therefore, even if an operation of the second lever is started, in an initial stage, the operating pin that is the operating mechanism does not operate the second link and operates only the first link. Accordingly, in the initial stage, the second lever releases the lock on the longitudinal sliding mechanism but does not release the lock on the lateral sliding mechanism. The second lever releases the lock on the lateral sliding mechanism after releasing the lock on the longitudinal sliding mechanism.

In the vehicle seat described above, the first link and the second link may be supported so as to be pivotable about a single axis, one of the first link and the second link may be urged by a spring so as to pivot in one direction such that the one of the first link and the second link is held, at an initial position, the other of the first link and the second link may pivot together with the one of the first link and the second link when the first link and the second link are engaged with each other via a hook, and the other of the first link and the second link may stop pivoting together with the one of the first link and the second link upon cancellation of engagement between the first link and the second link, which has been provided by the hook.

In the vehicle seat described above, because the first link and the second link are connected to each other in the above-described manner, a simple structure, in which only one pivot shaft and only one spring are used, allow these links to pivot together with each other or to stop pivoting together with each other upon cancellation of engagement therebetween provided by the hook. Thus, it is possible to stagger the timing at which the lock on the longitudinal sliding mechanism is released and the timing at which the lock on the lateral sliding mechanism is released. Therefore, it is possible to release the lock on only one of the sliding mechanisms, or to release the locks on both of the sliding mechanisms.

In the vehicle seat described above, the first link may be in an L-shape, and have arms that extend in two radial directions from the single axis. Further, a cable for releasing the lock on the longitudinal sliding mechanism may be connected to one of the arms that extend in the two radial directions.

In the vehicle seat described above, the second link may be in a T-shape, extend from the single axis, and pivot about the single axis. Further, one of arms of the T-shaped second link, which extend in opposite directions, be pivoted upon reception of pivot operating force from the operating mechanism, and a cable for releasing the lock on the lateral sliding mechanism be connected to the other arm. Further, the hook may be provided at the other of the arms of the T-shaped second link, which extend in the opposite directions.

With the vehicle seat described above, it is possible to reliably release the locks on the longitudinal sliding mechanism and the lateral sliding mechanism in response to a motion of the simply structured operating pin, by providing the first link and the second link having uncomplicated shapes and the hook provided at the second link.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereafter, an embodiment of the invention will be described with reference to the accompanying drawings.

Figure 1:
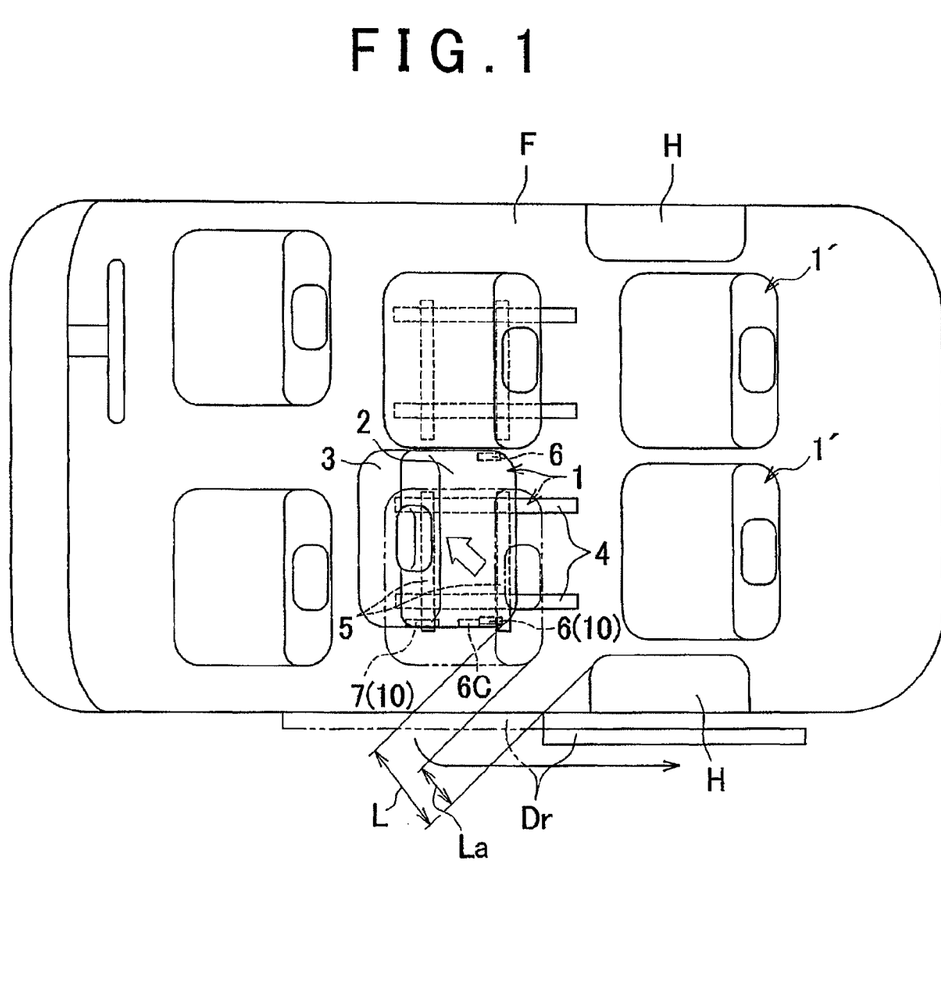
FIG. 1 is a plain view schematically showing the structure of a vehicle seat according to an embodiment of the invention.
Figure 2:
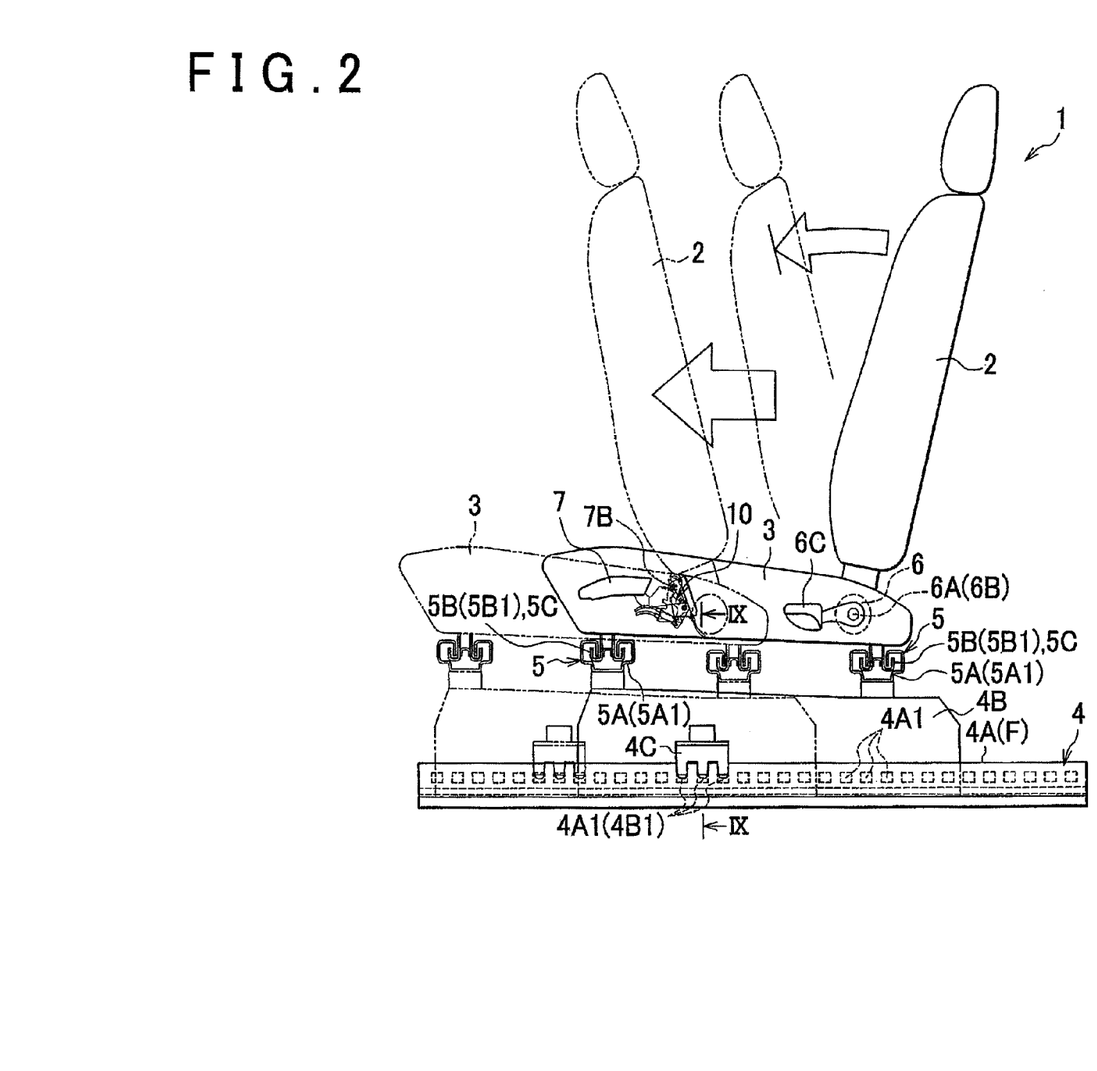
FIG. 2 is a side view of the vehicle seat according to the embodiment of the invention.

First, the structure of a vehicle seat according to an embodiment of the invention will be described with reference to FIGS. 1 to 12. As shown in FIG. 1, the vehicle seat according to the embodiment is structured such that a seat body 1 is allowed to slide relative to a vehicle floor F in the vehicle longitudinal direction by mechanisms for sliding the seat body 1 in the vehicle longitudinal direction (longitudinal sliding mechanisms 4), and is allowed to slide relative to the vehicle floor F in the vehicle lateral direction by mechanisms for sliding the seat body 1 in the vehicle lateral direction (lateral sliding mechanisms 5). The longitudinal sliding mechanisms 4 and the lateral sliding mechanisms 5 are usually locked so that the seat body 1 is prohibited to slide, and the locks on these mechanisms 4, 5 are released by operating an operating lever 7 provided at the laterally outward side of the seat body 1, as shown in FIG. 2.

In addition, the locks on these mechanisms 4, 5 may be released also through an operation for tilting a seat back 2 to a forward tilt position, described later in detail, by operating a release lever 6C that is also provided at the laterally outward side of the seat body 1. In the case where the locks are released by operating the release lever 6C, the seat body 1 is allowed to slide toward the front of the vehicle and inward in the vehicle, in a position in which the seat body 1 is folded forward compactly by tilting the seat back 2 toward the front of the vehicle, as shown in FIG. 1. This makes it possible to create a large boarding space L, through which an occupant gets into a seat in the back row (third row seat 1') from a door Dr located lateral to the seat body 1. The boarding space L is larger than an original space La that is present before moving the seat body 1 as described above. Note that, the release lever 6C is an example of a first lever according to the invention, and the operating lever 7 is an example of a second lever according to the invention.

The structure of each component of the vehicle seat will be described in detail below. As shown in FIG. 2, the seat body 1 includes a seat back 2 that serves as a backrest, and a seat cushion 3 that serves as a seating portion. The lower ends at both sides of the seat back 2 are connected to the rear ends at respective sides of the seat cushion 3 via reclining mechanisms 6 that serve as pivot shaft mechanisms of which the pivot motions may be prohibited. With this structure, the reclining angle of the seat back 2 relative to the seat cushion 3 is usually fixed to a predetermined angle by the reclining mechanisms 6. Prohibitions on the pivot motions of the reclining mechanisms 6 are simultaneously cancelled upon an operation of the release lever 6C.

Figure 10:
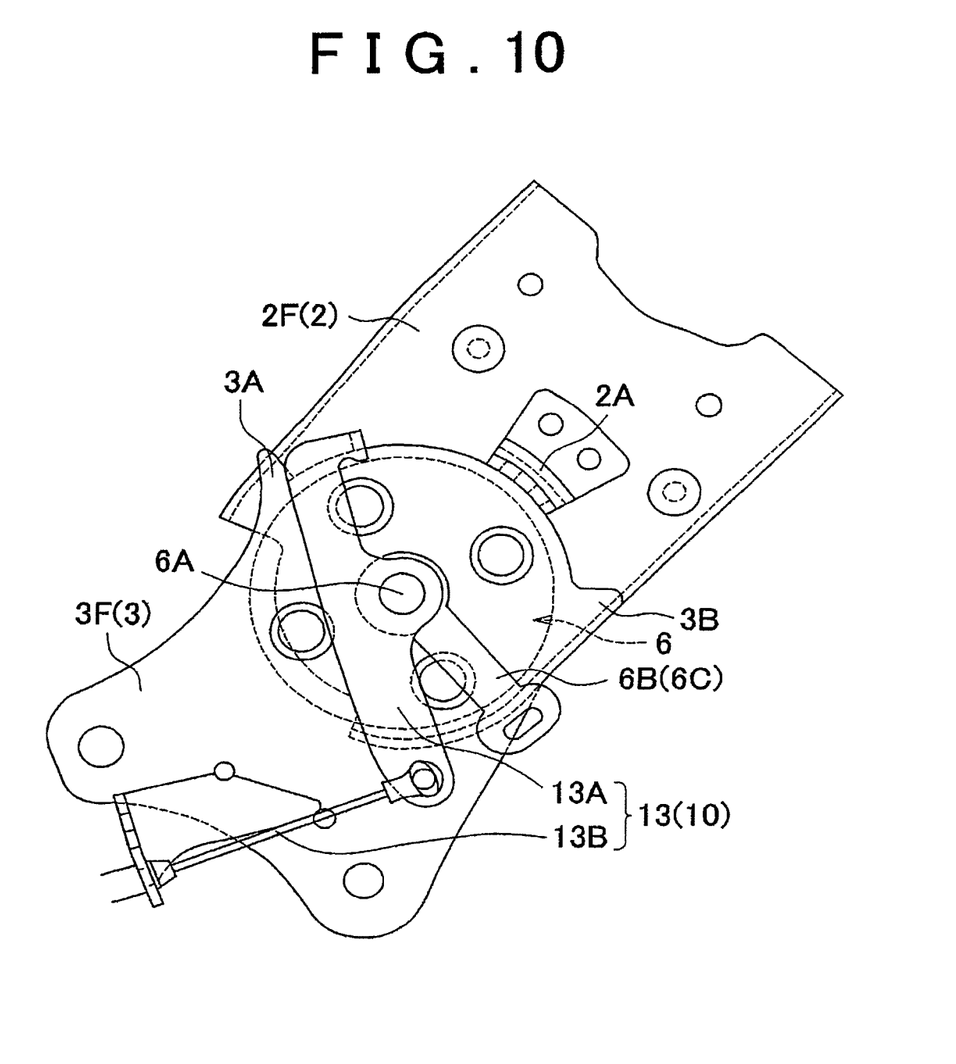
FIG. 10 is an enlarged view showing the structure of a transmission mechanism of the vehicle seat according to the embodiment of the invention.

More specifically, as shown in FIG. 10, the reclining mechanisms 6 are provided between outer plate portions of respective side frames of a back frame 2F that constitutes the framework of the seat back 2 and inner plate portions of respective side frames of a cushion frame 3F that constitutes the framework of the seat cushion 3. Each reclining mechanism 6 connects the outer plate portion and the inner plate portion to each other. Prohibitions on the pivot motions of the reclining mechanisms 6 are cancelled simultaneously upon an operation of the release lever 6C (see FIG. 2). When the release lever 6 is operated, operating arms 6B secured to operating shafts 6A that pass through the centers of the corresponding operating arms 6B are pivoted via cables (not shown), and the operating shafts 6A are thereby rotated, whereby the prohibitions are cancelled.

Due to this operation, fixation of the reclining angle of the seat back 2 is cancelled, and the seat back 2 is allowed to tilt back and forth about the axis of each reclining mechanism 6 (axis of each operating shaft 6A). As a result, if an occupant is not seated in the seat body 1, the seat back 2 is pushed to a forward tilt position shown in FIG. 11 by an urging force of a spring (not shown) disposed between the seat back 2 and the seat cushion 3. More specifically, the seat back 2 is tiltable forward to a position where L-shaped locking plates 2A fixed to the respective side frames of the back frame 2F contact front projections (forward tilt stoppers 3A) formed at the respective side frames of the cushion frame 3F of the seat cushion 3, and tiltable backward to a position where the locking plates 2A contact rear projections (backward tilt stoppers 3B) formed at the respective side frames of the cushion frame 3F. When the fixation of the reclining angle provided by the reclining mechanisms 6 is cancelled and thus the seat back 2 is urged forward by the spring, the seat back 2 is tilted to the position where the locking plates 2A contact the forward tilt stoppers 3A, and the seat back 2 is held at this position.

Next, as shown in FIGS. 1 and 2, the seat cushion 3 is supported at its lower portion by the vehicle floor F via a pair of front and rear lateral sliding mechanisms 5 and a pair of left and right longitudinal sliding mechanisms 4. The lateral sliding mechanisms 5 are arranged on the longitudinal sliding mechanisms 4. The lateral sliding mechanisms 5 and the longitudinal sliding mechanisms 4 are arranged in parallel crosses. Each longitudinal sliding mechanism 4 has a long slide rail 4A that extends in the longitudinal direction of the vehicle, a slider 4B that is fitted to the slide rail 4A so as to be slidable along the slide rail 4A, and a locking hook 4C capable of prohibiting sliding motion of the slider 4B relative to the slide rail 4A. The slide rails 4A are fixedly provided on the vehicle floor F. Each sliding mechanism 5 has a long slide rail 5A that extends in the lateral direction of the vehicle, a slider 5B that is fitted to the slide rail 5A so as to be slidable along the slide rail 5A, and a locking hook 5C capable of prohibiting sliding motion of the slider 5B relative to the slide rail 5A. Each slide rail 5A is fixedly provided on the upper portions of the sliders 4B of the longitudinal sliding mechanisms 4 so as to straddle each the slider 413. Each side frame of the cushion frame 3F of the seat cushion 3 is fixedly provided on the upper portions of the sliders 5B fitted to the slide rails 5A so as to straddle each slider 5B.

Figure 8:
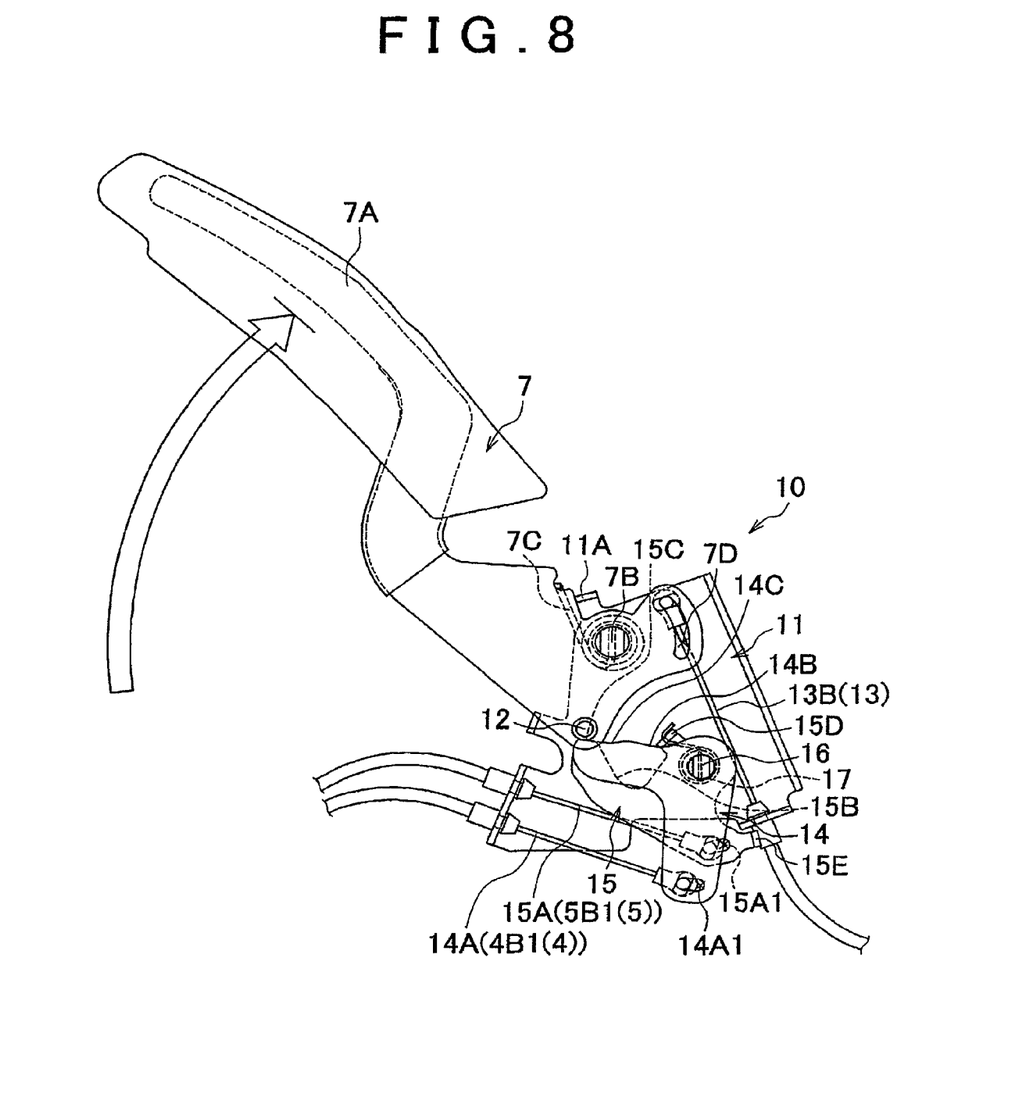
FIG. 8 is an enlarged view showing the state where the operating lever is fully operated.
Figure 9:
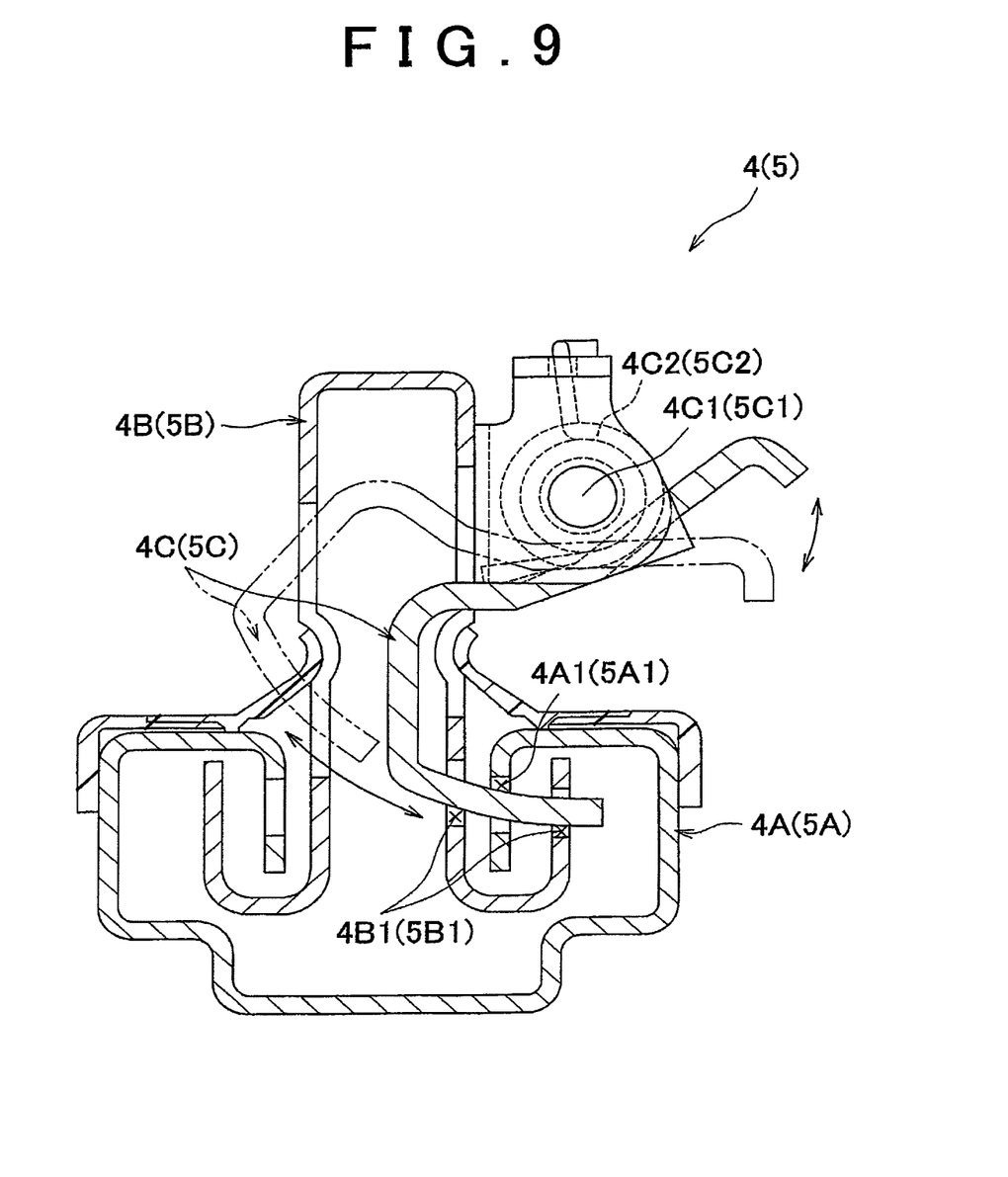
FIG. 9 is a cross-sectional view taken along the line IX-IX in FIG. 2, showing the structure for locking the longitudinal sliding mechanisms (lateral sliding mechanisms) of the vehicle seat according to the embodiment of the invention.

Next, the structures for prohibiting sliding motions of the longitudinal sliding mechanisms 4 and the lateral sliding mechanisms 5 will be described with reference to FIG. 9. Note that, the structure for prohibiting the sliding motion of the longitudinal sliding mechanisms 4 is basically the same as the structure for prohibiting the sliding motion of the lateral sliding mechanisms 5. Therefore, in the following, the structure for prohibiting the sliding motion of the longitudinal sliding mechanisms 4 will be mainly described. Along with this description, description of the structure for prohibiting the sliding motion of the lateral sliding mechanisms 5 will be provided by indicating the reference numbers of the components of this structure in parentheses. The locking hook 4C (5C) is connected to the slider 413 (5B) so as to be pivotable about a pivot shaft 4C1 (5C1). Usually, the locking hook 4C (5C) is pivoted (in the counterclockwise direction in the drawings) by urging force of a spring 4C2 (5C2) disposed between the locking hook 4C (5C) and the slider 4B (5B) and thus the an end of the locking hook 4C (5C) is passed through a locking hole 4B1 (5B1) formed in the slider 4B (5B) and a locking hole 4A1 (5A1) formed in the slide rail 4A (5A). In this way, the locking hook 4C (5C) prohibits sliding motion of the slider 4B (5B). As will be described later with reference to FIGS. 8 and 12, when the operating lever 7 is operated to pull a cable 14A (15A), the locking hook 4C (5C) is pivoted in such a direction that the locking hook 4C (5C) is removed out of the locking holes 4A1 (5A1) and 4B1 (5B1) (the clockwise direction in the drawing) against the urging force of the spring 4C2 (5C2) as indicated by a virtual line in FIG. 9. As a result, prohibition of the sliding motion of the slider 4B (5B) is cancelled. As shown in FIG. 2, multiple locking holes 4A1 (5A1) are formed in the slide rail 4A (5A) so as to be aligned at regular intervals along the longitudinal direction of the slide rail 4A (5A). Thus, the sliding motion of the slider 4B (5B) may be prevented at any position within a wide range.

Figure 3:
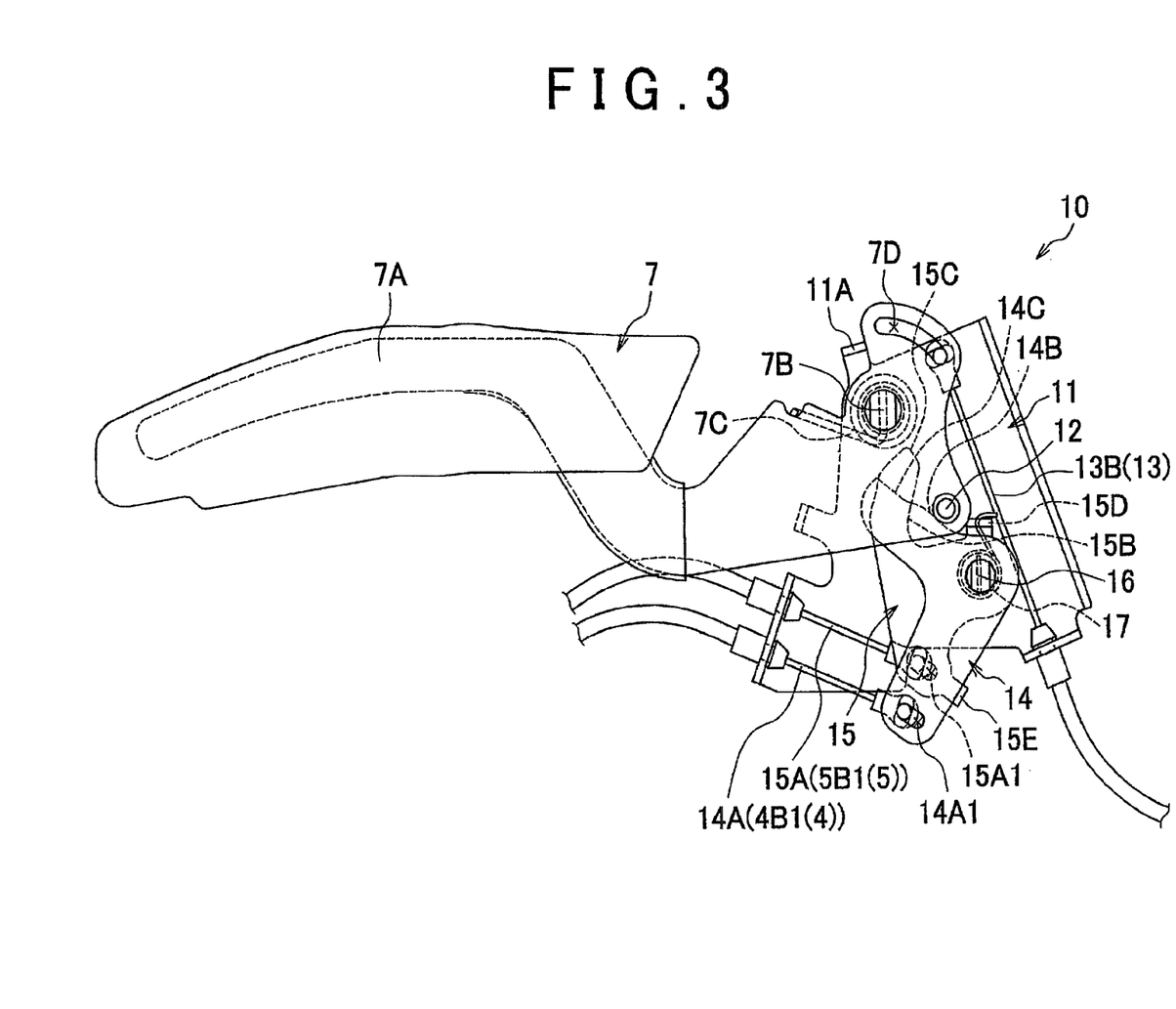
FIG. 3 is an enlarged view of an operating mechanism of the vehicle seat according to the embodiment of the invention.

Next, the structure of the operating lever 7 and the structure of a release mechanism 10 that releases the locks on the longitudinal sliding mechanisms 4 and the lateral sliding mechanisms 5 in response to an operation of the operating lever 7 will be described. As shown in FIG. 3, the operating lever 7 is connected at a connecting shaft 7B to a base plate 11 fixed to the cushion frame 3F of the seat cushion 3 such that the operating lever 7 is allowed to be pulled up by being pivoted about the connecting shaft 7B. Usually, the operating lever 7 is urged by urging force of a spring 7C disposed between the operating lever 7 and the base plate 11 so as to pivot in such a direction as to be moved down (counterclockwise direction in the drawing) with respect to the base plate 11. As a result, the operating lever 7 contacts the rear side of a stopper 11A formed at an upper end of the base plate 11, and held at this position. The operating lever 7 is structured to transmit, to the release mechanism 10, operating force generated by pulling up an operating portion 7A that is formed by fitting a resin handle onto an arm that extends toward the front of the vehicle. As shown in FIG. 8, the operating lever 7 is allowed to be pulled up to a position where the operating lever 7 contacts the front side of the stopper 11A formed at the upper end of the base plate 11.

Figure 11:
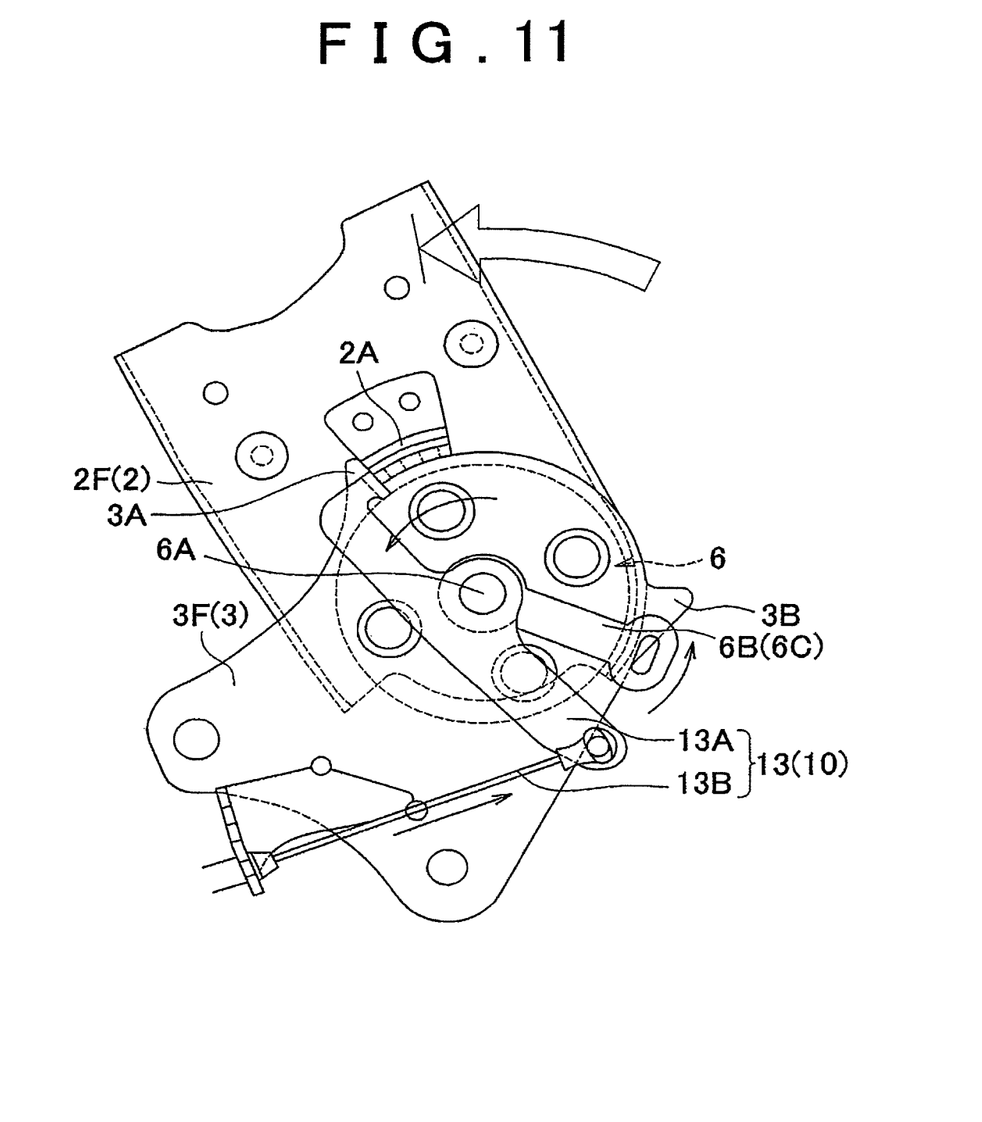
FIG. 11 is an enlarged view showing the state where the transmission mechanism is activated by tilting a seat back toward the front of the vehicle, in the vehicle seat according to the embodiment of the invention.
Figure 12:
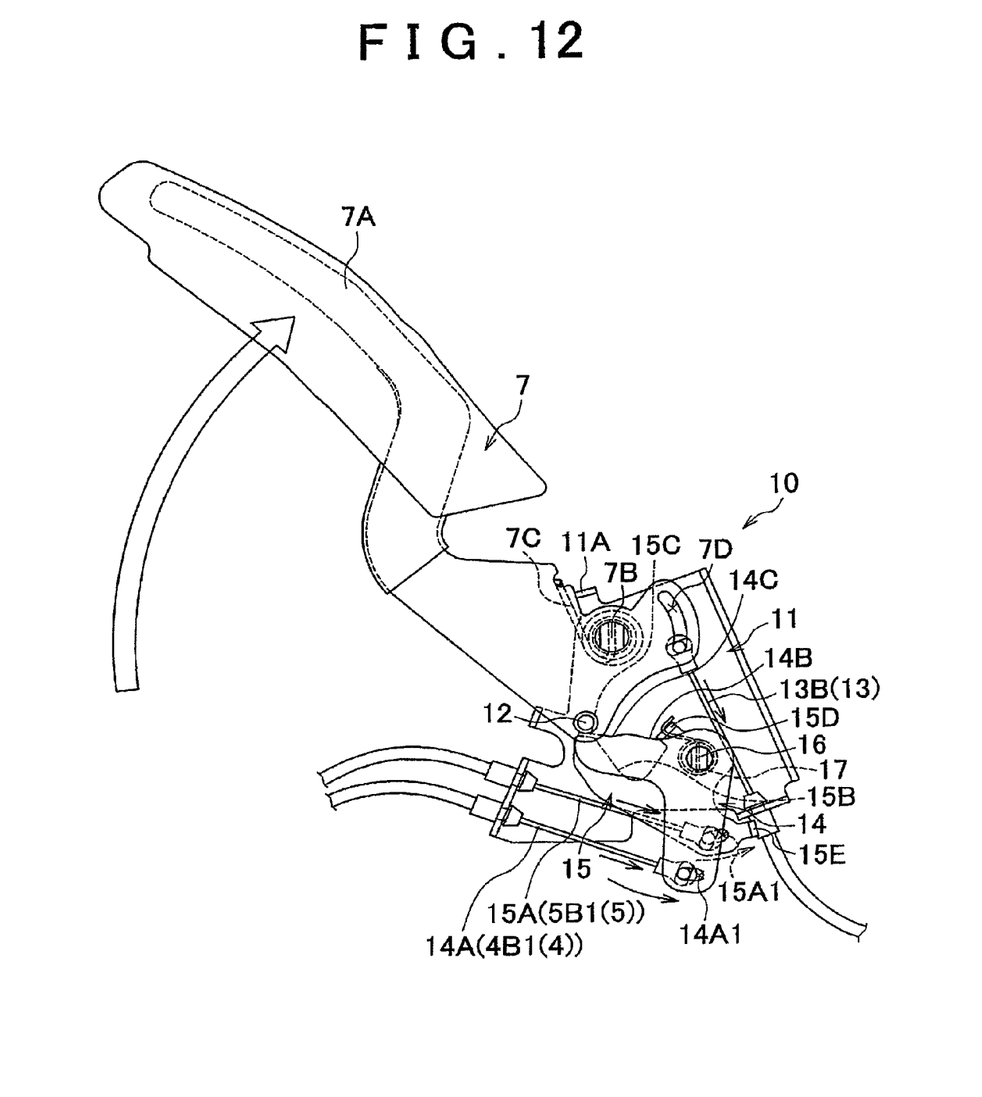
FIG. 12 is an enlarged view showing the state where the operating lever is operated by tilting the seat back toward the front of the vehicle, in the vehicle seat according to the embodiment of the invention.

As shown in FIG. 3, the release mechanism 10 has an operating pin 12, a transmission mechanism 13, a first link 14, and a second link 15. The operating pin 12 is an example of an operating mechanism according to the invention. The operating pin 12 is fixedly connected to the operating lever 7. The operating pin 12 moves as the operating lever 7 is pulled up, and pushes the first link 14 and second link 15, described later in detail, to cause pivot motions of the first link 14 and the second link 15. As shown in FIG. 10, the transmission mechanism 13 includes an operating arm 13A pivotally connected to the operating shaft 6A of the reclining mechanism 6 provided at the laterally outward side of the seat body 1, and an operating cable 13B that connects the lower end of the operating arm 13A to the upper rear end of the operating lever 7 shown in FIG. 3. In the initial state of the operating arm 13A shown in FIG. 10, the upper end of the operating arm 13A is held so as to be exposed on the locus of the pivot motion of the locking plate 2A fixed to the back frame 2F of the seat back 2 as shown in FIG. 10, by the force which is transmitted through the operating cable 13B and with which the operating lever 7 shown in FIG. 3 is held at the initial position by urging force of the spring 7C. As shown in FIG. 3, the end of the operating cable 13B, which is connected to the operating lever 7, is inserted within a slot 7D formed in the operating lever 7, and is held at the lower end of the slot 7D in the initial state. The slot 7D is shaped in an arc centering on the connecting shaft 7B. The operating lever 7 is moved up in the following manner with the use of the transmission mechanism 13 structured as described above. When the seat back 2 is tilted to the forward tilt position through the operation of the release lever 6C described above (see FIG. 2), the operating arm 13A is pushed by the locking plate 2A so as to pivot in the counterclockwise direction in the drawing, as shown in FIG. 11. As a result, the operating lever 7 is moved up as shown in FIG. 12 by the force transmitted through the operating cable 13B.

As shown in FIG. 3, the first link 14 is provided side by side with the second link 15 in the axial direction, and is connected to the second link 15 via a pivot shaft 16 such that the first link 15 is pivotable together with the second link 15 about the pivot shaft 16 with respect to the base plate 11. More specifically, the pivot shaft 16 is secured to the base plate 11, and the first link 14 and the second link 15 are supported so as to be pivotable about the pivot shaft 16. The first link 14 is formed into an L-shape such that arms of the first link 14 extend in two radial directions from the pivot shaft 16. Among these arms that extend in the two radial directions, the arm that extends toward the upper front of the seat from the pivot shaft 16 receives pivot operating force transmitted via the operating pin 12 connected to the operating lever 7 so that the first link 14 is pivoted. The arm that extends toward the lower front of the seat from the pivot shaft 16 is connected to the cable 14A for releasing the lock on the locking hook 4C of each longitudinal sliding mechanism 4 shown in FIG. 9, and is pivoted to pull the cable 14A, thereby releasing the lock on each longitudinal sliding mechanism 4. As shown in FIG. 3, the end of the cable 14A, which is connected to the first link 14, is inserted within a slot 14A1 formed in the first link 14. The slot 14A1 is shaped in an arc centering on the pivot shaft 16.

The second link 15 is formed in a T-shape so as to extend toward the front of the seat from the pivot shaft 16. An arm that faces the front of the seat and extends upward receives pivot operating force transmitted via the operating pin 12 connected to the operating lever 7 so that the second link 15 is pivoted. An arm that faces the front of the seat and extends downward is connected to the cable 15A for releasing the lock on the locking hook 5C of each lateral sliding mechanism 5 shown in FIG. 9, and is pivoted to pull the cable 15A, thereby releasing the lock on each lateral sliding mechanism 5. As shown in FIG. 3, the end of the cable 15A, which is connected to the second link 15, is inserted within a slot 15A1 formed in the second link 15. The slot 15A1 is shaped in an arc centering on the pivot shaft 16.

More specifically, the distance between the position at which the cable 14A is connected to the first link 14 and the pivot shaft 16 is longer than the distance between the position at which the cable 15A is connected to the second link 15 and the pivot shaft 16. With this structure, when the first link 14 and the second link 15 are pivoted by the same angle, the amount by which the cable 14A connected to the first link 14 is pulled is larger than the amount by which the cable 15A connected to the second link 15 is pulled.

A spring 17 is disposed between a hooking portion 15D of the second link 15 and the pivot shaft 16, and the second link 15 is usually urged so as to pivot in the clockwise direction in the drawing by urging force of the spring 17. In addition, a hook 15E is formed at the arm of the second link 15, which extends downward. The hook 15E extends from the arm of the second link 15 so as to be able to contact the edge of the arm of the first link 14, which extends downward. With this structure, in the initial state, the second link 15 transmits force, which is applied by the spring 17 so as to pivot the second link 15 in the clockwise direction shown in the drawing, to the first link 14 via the hook 15E to urge the first link 14 in the clockwise direction, and the second link 15 is held, with its pivot motion stopped, at a position where the first link 14 contacts and engages with the operating pin 12 fixed to the operating lever 7. In this state, the second link 15 does not contact the operating pin 12, and there is a gap between the second link 15 and the operating pin 12 in the direction in which the second link 15 pivots.

Figure 4:
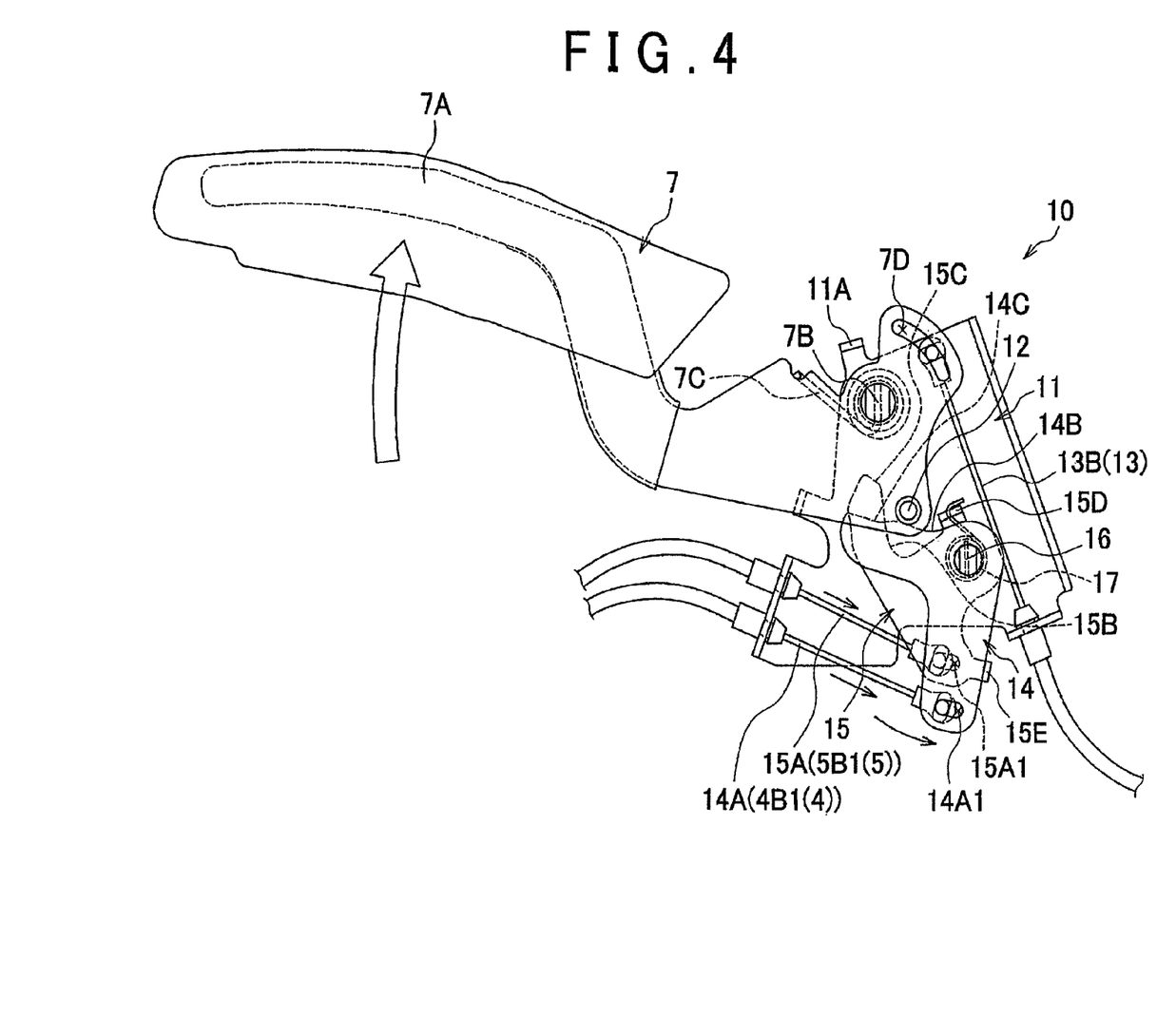
FIG. 4 is an enlarged view showing the state where the locks on longitudinal sliding mechanisms are released through an operation of an operating lever of the vehicle seat according to the embodiment of the invention.

The release mechanism 10 structured as described above is activated in the manner described below when the operating lever 7 is pulled up. As the operating lever 7 is pulled up from the initial position shown in FIG. 3, first, as shown in FIG. 4, the arm of the first link 14 is pushed by the operating pin 12 so as to pivot in the counterclockwise direction in the drawing. As a result, the second link 15 that is in contact at the hook 15E with the first link 14 also pivots in the counterclockwise direction in the drawing together with the first link 14 because the second link 15 is pushed by the first link 14. Due to this pivot motion, the cable 14A connected to the first link 14 is pulled by an amount larger than an amount by which the cable 15A connected to the second link 15 is pulled. As a result, the locks on the longitudinal sliding mechanisms 4 are released.

Figure 5:
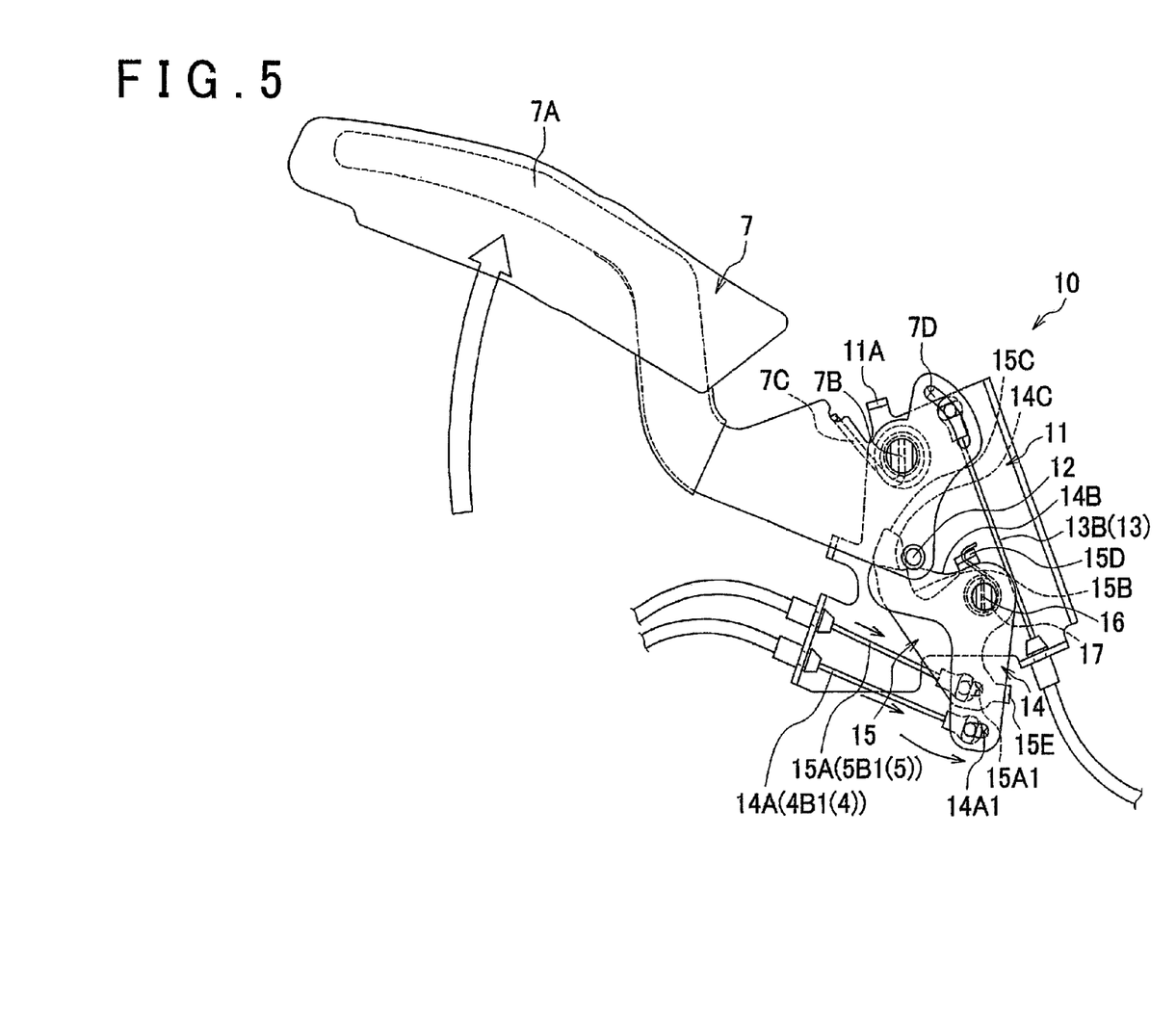
FIG. 5 is an enlarged view showing the state where operating force from the operating lever is no longer transmitted to a first link (operating force from the operating lever is relieved without being transmitted to the first link)

When the operating lever 7 is further pulled up, as shown in FIG. 5, the operating pin 12 contacts the arm of the second link 15, which extends upward. If the operating lever 7 is further pulled up, the operating pin 12 causes the second link 15 to pivot in the counterclockwise direction in the drawing (see FIG. 6). As a result, the second link 15 pivots alone by a large amount while the first link 14 does not pivot, and cable 15A connected to the second link 15 is pulled by a large amount, and the locks on the lateral sliding mechanisms 5 are released.

Figure 6:
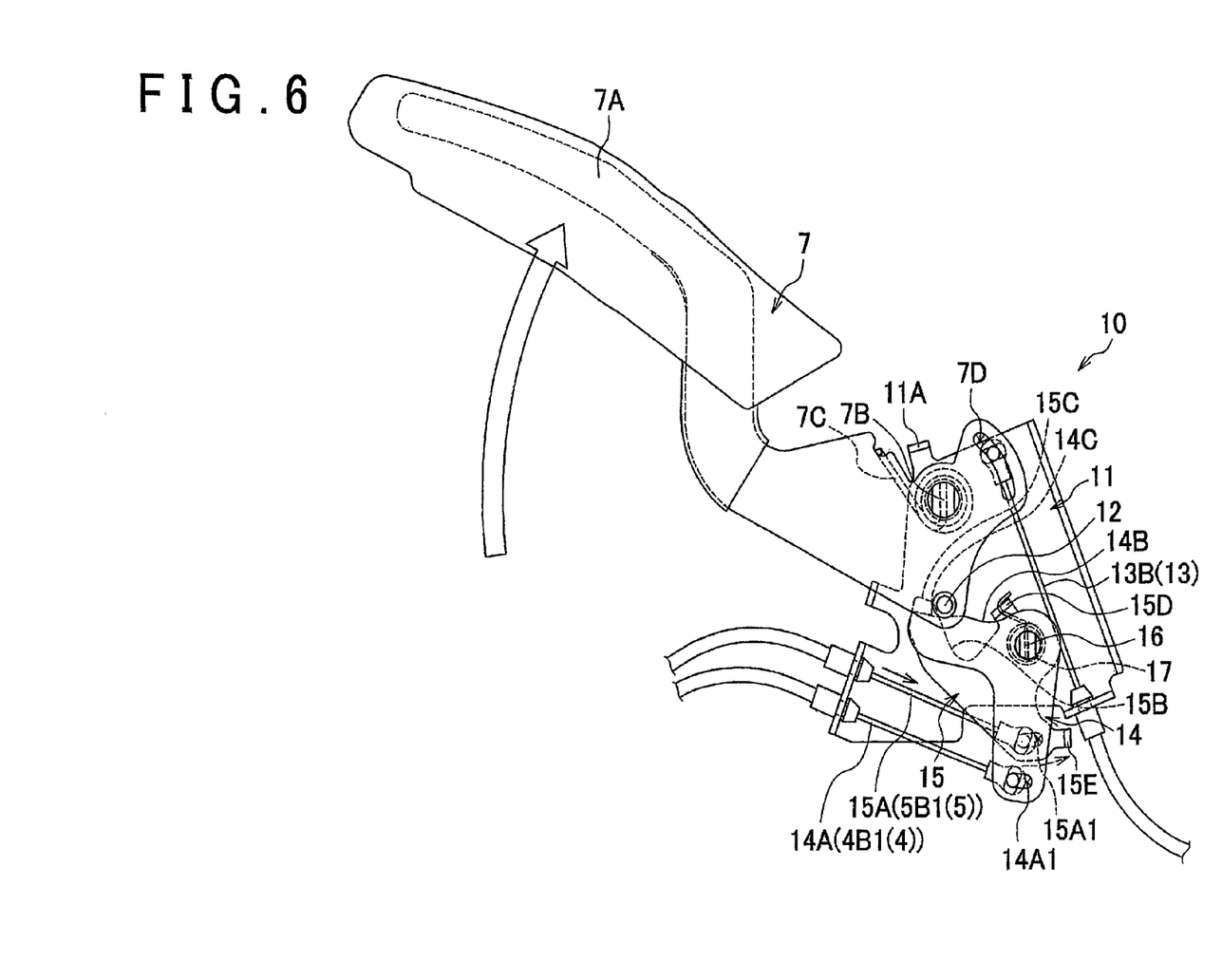
FIG. 6 is an enlarged view showing the state where the locks on lateral sliding mechanisms are released through an operation of the operating lever.

A flat transmitting portion 14B that extends in the radial direction and a relief portion 14C curved in an arc-shape are formed at the upper edge of the arm of the first link 14, which is pushed by the operating pin 12. The transmitting portion 14B and the relief portion 14C are formed side by side in the radial direction. The transmitting portion 14B contacts the operating pin 12 when the first link 14 is in the initial state. The relief portion 14C forms an arc centering on the connecting shaft 7B when the first link 14 is pivoted by the operating pin 12 to the pivot position in FIG. 5. As shown in FIGS. 3 to 5, during a period from when the first link 14 is at the initial pivot position, at which the first link 14 structured as described above is started to be pushed by the operating pin 12 through the operation for pulling up the operating lever 7, until when the first link 14 reaches an intermediate pivot position (shown in FIG. 5), the operating pin 12 runs on the transmitting portion 14B, and therefore the first link 14 is pivoted as the operating lever 7 is pulled up. However, as shown in FIGS. 5 and 6, when the operating lever 7 is further pulled up beyond the intermediate pivot position described above, the operating pin 12 runs on the relief portion 14C, and therefore the first link 14 no longer receives force transmitted via the operating pin 12 and the first link 14 is prevented from further pivoting by relieving the motion of the operating pin 12. Thus, after the lock on each longitudinal sliding mechanism 4, which is unlocked before release of the lock on each lateral sliding mechanism 5, is released, pulling force is no longer applied to the longitudinal sliding mechanism 4 from the cable 14A. Thus, an excessive load is not applied to the cable 14A and a lock structural portion (locking hook 4C: see FIG. 9) of each longitudinal sliding mechanism 4.

Figure 7:
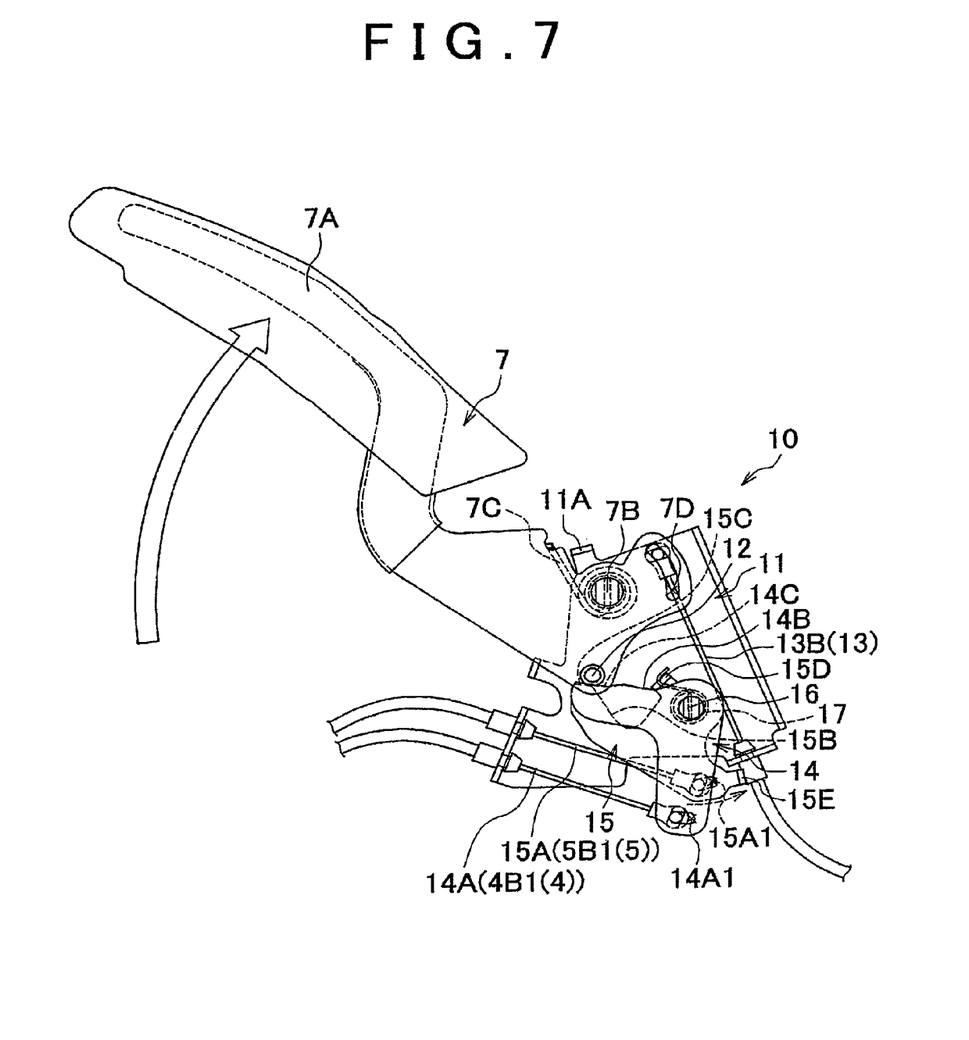
FIG. 7 is an enlarged view showing the state where operating force from the operating lever is no longer transmitted to a second link (operating force from the operating lever is relieved without being transmitted to the second link)

Similarly, a flat transmitting portion 15B that extends in the radial direction and a relief portion 15C curved in an arc-shape are formed at the right edge of the arm of the second link 15, which is pushed by the operating pin 12. The transmitting portion 15B and the relief portion 15C are formed side by side in the radial direction. As shown in FIG. 5, the transmitting portion 15B contacts the operating pin 12 before the relief portion 15C contacts the operating pin 12 as the operating lever 7 is pulled up. The relief portion 15C forms an arc centering on the connecting shaft 7B when the second link 15 is pivoted by the operating pin 12 to the pivot position in FIG. 7. As shown in FIGS. 3 to 5, during a period from when the second link 15 is at the initial pivot position (position in FIG. 5), at which the second link 15 structured as described above is started to be pushed by the operating pin 12 through the operation for pulling up the operating lever 7, until when the second link 15 reaches an intermediate pivot position (shown in FIG. 7), the operating pin 12 runs on the transmitting portion 15B, and therefore the second link 15 is pivoted as the operating lever 7 is pulled up. However, as shown in FIGS. 7 and 8, when the operating lever 7 is further pulled up beyond the intermediate pivot position described above, the operating pin 12 runs on the relief portion 15C, and therefore the second link 15 no longer receives force transmitted via the operating pin 12 and the second link 15 is prevented from further pivoting by relieving the motion of the operating pin 12. Thus, after the lock on each lateral sliding mechanism 5 is released, pulling force is no longer applied to the lateral sliding mechanism 5 from the cable 15A. Thus, an excessive load is not applied to the cable 15A and a lock structural portion (locking hook 5C: see FIG. 9) of each lateral sliding mechanism 5.

In addition, as shown in FIG. 2, the locks on the longitudinal sliding mechanisms 4 and the lateral sliding mechanisms 5 may be released via the release mechanism 10 by pulling up the release lever 6C. That is, when the release lever 6C is operated, as described above with reference to FIG. 11, the seat back 2 is tilted to the forward tilt, position and the operating arm 13A is pushed so as to pivot. Due to this pivot motion, the operating cable 13B is pulled as shown in FIG. 12 and the operating lever 7 is moved up. Thus, as described with reference to FIGS. 3 to 8, the release mechanism 10 is actuated to release the locks on the longitudinal sliding mechanisms 4 and the lateral sliding mechanisms 5.

As described above, in the vehicle seat according to the embodiment, when the release lever 6C is operated to tilt the seat back 2 to the forward tilt position, locks on both the longitudinal sliding mechanisms 4 and the lateral sliding mechanisms 5 are released by the release mechanism 10. Thus, the seat body 1 is allowed to slide toward the front of the vehicle and inward in the vehicle, in a position in which the seat body 1 is folded forward compactly by tilting the seat back 2 toward the front of the vehicle. This makes it possible to create the large boarding space L, through which an occupant gets into the seat in the back row (third row seat 1') from the door Dr located lateral to the seat body 1. As described above, it is possible to move the vehicle seat such that the large boarding space L through which an occupant gets into the vehicle is obtained through a simple operation of the release lever 6C.

The release mechanism 10 is actuated when the seat back 2 is tilted to the forward tilt position through an operation of the release lever 6C. Alternatively, the release mechanism 10 may be actuated when the operating lever 7 is operated by an occupant sitting on the vehicle seat. Thus, not only when the seat body 1 is moved to increase the boarding space L through which an occupant gets into the vehicle, but also when the seat body 1 is moved to adjust the seating location of the occupant, it is possible to flexibly adjust the position of the seat body 1 in the vehicle longitudinal direction and the vehicle lateral direction through a simple operation. Thus, as shown in FIG. 1, it is possible to slide the seat body 1 toward the rear of the vehicle after moving the seat body 1 inward to avoid a wheel house H. As a result, it is possible to increase the region in which the seat body 1 is allowed to slide in the longitudinal direction.

In addition, the first link 14 and the second link 15 that constitute the release mechanism 10 are supported so as to be pivotable about the same pivot shaft, and the second link 15 is urged by the spring 17 so as to pivot in one direction and is held at initial position. Further, the second link 15 is allowed to pivot together with the first link 14 due to engagement of the hook 15E until the intermediate position is reached and to pivot alone after the intermediate position is reached. Thus, it is possible to stagger the timing at which the lock on each longitudinal sliding mechanism 4 is released and the timing at which the lock on each lateral sliding mechanism 5 is released with a simple structure in which a single pivot shaft 16 and a single spring 17 are used. As a result, it is possible to release the locks on only one of the sliding mechanisms 4 and the sliding mechanisms 5 (the longitudinal sliding mechanisms 4 in the embodiment) or release the locks on both the sliding mechanisms 4 and 5.

While one example embodiment of the invention has been described, the invention may be implemented in various other embodiments. For example, as an example of the operating mechanism according to the invention, the structure in which the operating pin 12 for activating the first link 14 and the second link 15 is secured to the operating lever 7 is described in the embodiment above. Alternatively, other operating mechanisms such as a gear mechanism or a link mechanism in which the first link 14 and the second link 15 are actuated through an operation of the first lever (release lever 6C) may be employed. In addition, as an example of the release mechanism according to the invention, the release mechanism 10 is described in the embodiment. The operating lever 7 (second lever) is operated by transmitting force generated when the seat back 2 is tilted forward through an operation of the release lever 6C (first lever) to the operating lever 7 (second lever), and the release mechanism 10 is activated by the motion of the operating lever 7 (second lever). Alternatively, the force generated when the seat back 2 is tilted forward through an operation of the release lever 6C (first lever) may be directly transmitted to the release mechanism 10 instead of being transmitted via the operating lever 7 (second lever) to actuate the release mechanism 10.

In addition, in the embodiment described above, the structure is employed in which the lock on each longitudinal sliding mechanism 4 is released first, and the lock on each lateral sliding mechanism 5 is then released by activating the release mechanism 10. Alternatively, a structure may be employed in which the lock on each lateral sliding mechanism 5 is released first, and the lock on each longitudinal sliding mechanism 4 is then released. Further alternatively, the locks on these sliding mechanisms 4 and 5 may be simultaneously released. In addition, the release mechanism according to the invention may also be structured such that the first link is urged by a spring so as to pivot, the second link pivots together with the first link due to engagement of the hook until an intermediate position is reached, and the first link pivots alone after that intermediate position is reached.

While the invention is described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and structures, other combinations and structures, including more, less or only a single element, are also within the scope of the invention.

What is claimed is:

1. A vehicle seat, comprising:
   a longitudinal sliding mechanism configured to support a seat body such that the seat body is slidable relative to a vehicle floor in a vehicle longitudinal direction;
   a lateral sliding mechanism configured to support the seat body such that the seat body is slidable in a vehicle lateral direction;
   a reclining mechanism configured to connect a seat back to a seat cushion and adjust a reclining angle of the seat back;
   a first lever configured to be able to cancel fixation of the reclining angle of the seat back, which has been provided by the reclining mechanism; and
   a release mechanism configured to release locks on both the longitudinal sliding mechanism and the lateral sliding mechanism upon detection of a motion of tilting the seat back to a forward tilt position, which is caused by an operation of the first lever.

2. The vehicle seat according to claim 1, wherein the release mechanism includes:
   an operating mechanism operated by a second lever that is operated by an occupant seated in the seat body;
   a transmission mechanism that operates the operating mechanism by transmitting a motion of tilting the seat back to the forward tilt position;
   a first link that is operated by the operating mechanism so as to release the lock on the longitudinal sliding mechanism; and
   a second link that is operated by the operating mechanism so as to release the lock on the lateral sliding mechanism.

3. The vehicle seat according to claim 2, wherein the operating mechanism is an operating pin that is fixedly attached to the second lever.

4. The vehicle seat according to claim 3, wherein when the second link is at an initial position, the second link is not in contact with the operating pin and there is a gap between the second link and the operating pin in a direction in which the second link pivots.

5. The vehicle seat according to claim 2, wherein:
   the first link and the second link are supported so as to be pivotable about a single axis;
   one of the first link and the second link is urged by a spring so as to pivot in one direction such that the one of the first link and the second link is held at an initial position; and
   the other of the first link and the second link pivots together with the one of the first link and the second link when the first link and the second link are engaged with each other via a hook, and the other of the first link and the second link stops pivoting together with the one of the first link and the second link upon cancellation of engagement between the first link and the second link, which has been provided by the hook.

6. The vehicle seat according to claim 5, wherein the first link is in an L-shape, and has arms that extend in two radial directions from the single axis.

7. The vehicle seat according to claim 6, wherein a cable for releasing the lock on the longitudinal sliding mechanism is connected to one of the arms that extend in the two radial directions.

8. The vehicle seat according to claim 5, wherein the second link is a T-shaped second link that extends from the single axis and pivots about the single axis.

9. The vehicle seat according to claim 8, wherein:
   the T-shaped second link has two arms, and wherein one of the arms of the T-shaped second link, which extend in opposite directions, is pivoted upon reception of pivot operating force from the operating mechanism; and
   a cable for releasing the lock on the lateral sliding mechanism is connected to the other of the arms of the T-shaped second link.

10. The vehicle seat according to claim 9, wherein the hook is provided at the other of the arms of the T-shaped second link.

* * * * *